United States Patent
Perna et al.

(10) Patent No.: US 6,767,376 B1
(45) Date of Patent: Jul. 27, 2004

(54) SELECTIVELY CONTROLLABLE MODULAR AUTO-THERMAL REFORMER AND METHOD FOR SAME

(75) Inventors: Mark A. Perna, Alliance, OH (US); Andrew F. Kisik, Homeworth, OH (US); Stephen W. Scoles, Lynchburg, VA (US); Ray L. Sullivan, Lynchburg, VA (US)

(73) Assignee: SOFCo-EFS Holdings, L.L.C., Alliance, OH (US)

(*) Notice: Subject to any disclaimer, the term of this patent is extended or adjusted under 35 U.S.C. 154(b) by 739 days.

(21) Appl. No.: 09/710,173

(22) Filed: Nov. 10, 2000

(51) Int. Cl.[7] .............................. C10K 1/00; C10K 1/34
(52) U.S. Cl. .......................................... 48/215; 422/197
(58) Field of Search ............................ 48/198.1, 198.7, 48/214 R, 215, 214 A, 127.9, 94, 95; 422/188, 196, 197, 198, 201, 202, 211, 222

(56) References Cited

U.S. PATENT DOCUMENTS 5,326,550 A * 7/1994 Adris et al. .................. 423/652
5,997,594 A * 12/1999 Edlund et al. .................. 48/76

FOREIGN PATENT DOCUMENTS

WO    WO 00/27518    5/2000

* cited by examiner

*Primary Examiner*—Samuel M. Heinrich
(74) *Attorney, Agent, or Firm*—D. Neil LaHaye

(57) ABSTRACT

An auto-thermal reformer assembly is provided having a plurality of self-contained reformer modules positioned within a pressure vessel. The reformer modules each contain catalyst for inducing reforming reactions to produce hydrogen rich gas. At least one heat exhanger is provided for transferring heat from the hydrogen rich gas to the reactants entering or inside of the pressure vessel.

28 Claims, 4 Drawing Sheets

SELECTIVELY CONTROLLABLE MODULAR AUTO-THERMAL REFORMER AND METHOD FOR SAME

This invention was conceived under government contract NSWC:N000167-98-C-0056. The United States' government may retain certain rights to this invention.

FIELD AND BACKGROUND OF THE INVENTION

The present invention relates generally to the field of fuel processors and in particular to a new and useful auto-thermal reformer for reforming hydrocarbon-based fuels to make hydrogen rich gas.

Fuel cell systems that generate electricity from hydrogen rich gas to provide stationary, decentralized energy supplies, or for use as an energy source for electric vehicles, are the subject of research activity throughout the world. At present, economic and practical aspects dictate that only universally available and generally accepted fuels can be considered for hydrogen rich gas generation. Natural gas is particularly attractive for stationary applications, whereas use of liquid hydrocarbon fuels is more likely in the mobile sector.

Reforming is a term of art used to describe the process of generating hydrogen rich gas for use in fuel cells. Reformers that generate hydrogen rich gas on an industrial scale have been known for decades; however, these industrial scale reformers cannot be efficiently scaled down for decentralized and/or mobile applications in the range of several tens or hundreds of kilowatts (kW). Steam-reforming and Auto-thermal reforming (ATR) are specific methods of reforming.

SUMMARY OF THE INVENTION

In ATR, fuel is partially reacted by adding air to the fuel and steam mixture in the reformer to heat it to the appropriate reaction temperatures. ATR is advantageous because it has lower steam requirements (e.g. a molar steam to carbon ratio of about 2.5 to 3.5) than steam reforming and it improves efficiency in comparison to steam-reforming. ATR relies on flameless oxidation of oxygen from the air, thereby resulting in combustion of about 20 to 33% of the fuel and a release of the heat needed to drive the ATR reforming reactions.

The unoxidized fuel endothermically reacts with steam to create a mixture of hydrogen, carbon monoxide and carbon dioxide. An ATR reformer quickly adapts to new operating conditions because of its direct coupling and dynamic ability to respond to changing loads. Furthermore, ATR does not require additional external burners (and their attendant power supplies), making the system less complex and less expensive.

It is an object of the present invention to provide an auto-thermal reformer system for converting liquid fuels into hydrogen rich gas for further possible use in a fuel cell power system.

Accordingly, an auto-thermal reformer is provided having a plurality of reformer modules housed within a pressure vessel, and including an integrated steam superheater which uses the hydrogen rich gas to beat the incoming steam mixture. The individual modules also contain catalyst beds and a heat exchanger for converting hot, atomized and vaporized liquid fuel into hydrogen rich gas.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
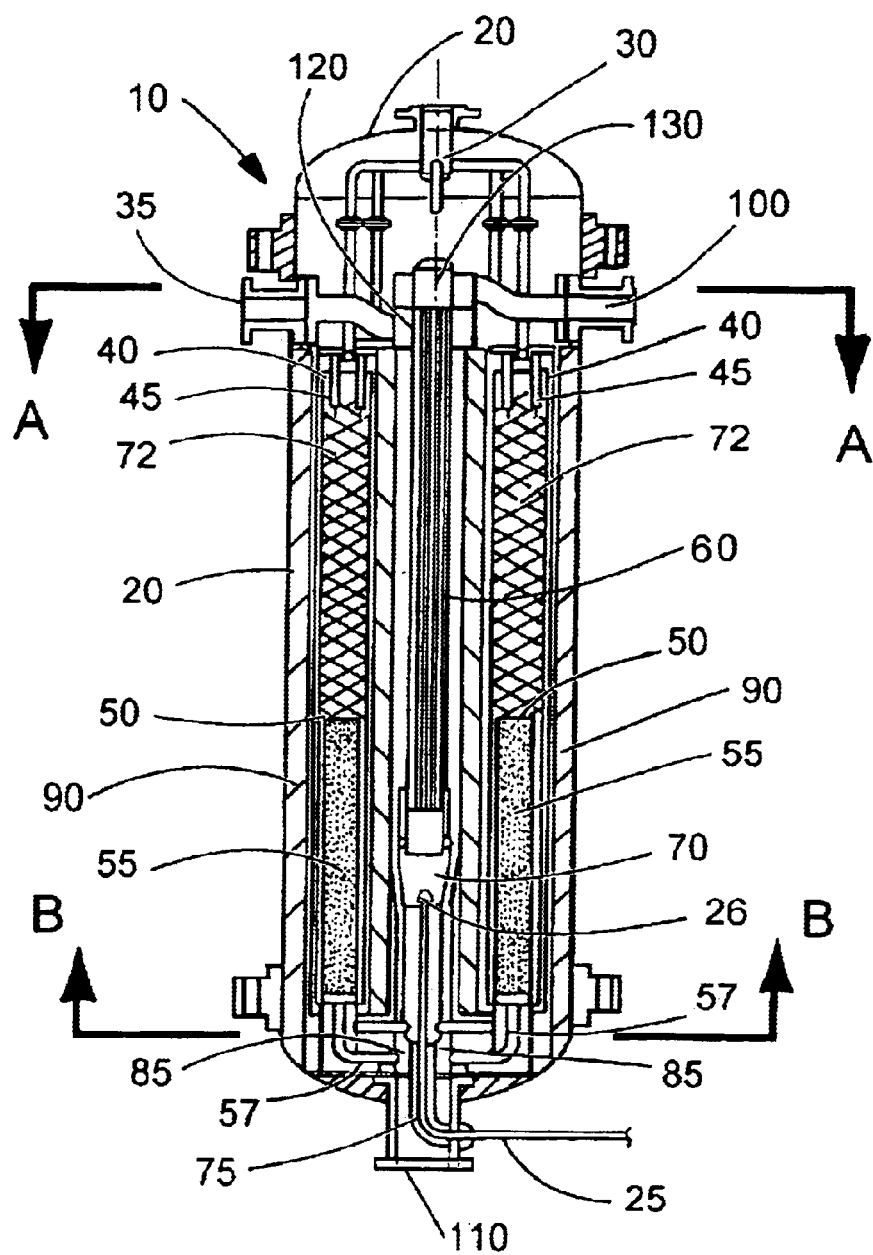
FIG. 1 is a cross-sectional side view of the auto-thermal reformer of the present invention.

Referring now to the drawings, in which like reference numerals are used to refer to the same or similar elements, FIG. 1 shows an auto-thermal reformer (ATR) assembly 10 having tubular reforming modules 50 and other equipment housed within pressure vessel 20. The liquid fuel is fed into the ATR assembly 10 through an inlet pipe 25 at the bottom of the vessel 20. Notably, inlet pipe 25 may be encased in protective shield tube 75 to prevent over heating of the liquid fuel feed. The incoming liquid fuel is then introduced into mixing chamber 70 of vessel 20 via atomizer 26.

Figure 2:
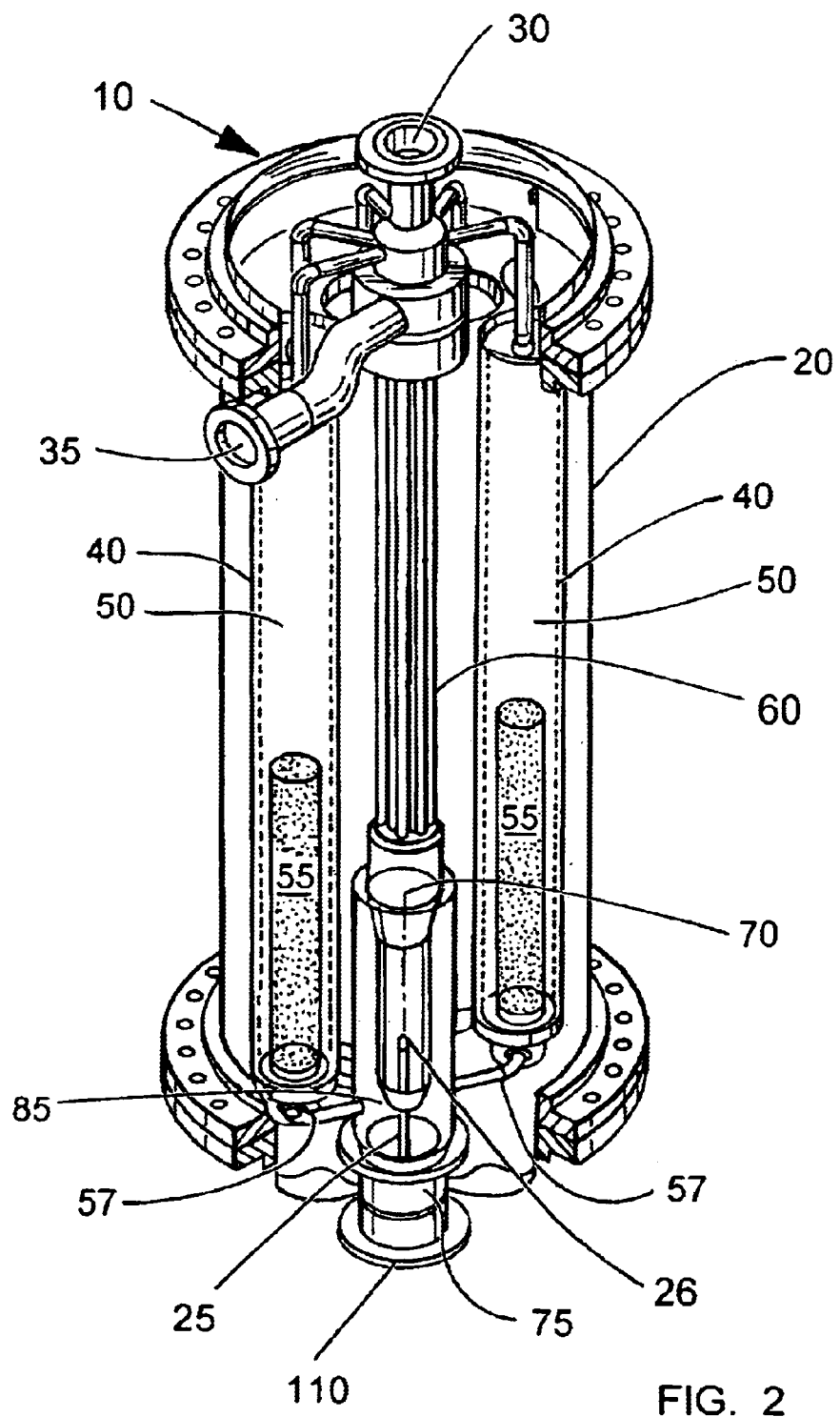
FIG. 2 is a front perspective view of the internal components of the reformer of FIG. 1.

Ideally, the assembly will have 8 modules, as implied by FIGS. 1 and 2, although this may be altered without departing from the principles of this invention. For the sake of clarity, the assembly shown in FIGS. 3 and 4 has 4 modules.

Air enters the top of vessel 20 via air distribution means 30. Distribution means 30 divides the airflow among the reforming modules 50. Air may be introduced directly into the top of modules 50 via nozzles 45, or other known means.

Steam also enters the top of vessel 20 through steam inlet 35. It then flows, separate from the air, in a downward direction through vessel 20, first being distributed into superheater 60 via air plenum 120. After exiting superheater 60, the superheated steam mixes with the liquid fuel in chamber 70. This fuel/steam mix then is directed upwardly through or around the individual reforming modules 50 via annular jacket 40. Preferably, the fuel/steam mix undergoes a heat exchange process with hydrogen rich gas exiting the module at this time.

After reaching the top of annular jacket 40, the steam/fuel is mixed with air in the top of each reforming module 50. While in the module 50, the steam/fuel/air mix comes into contact with catalyst means, such as catalyst bed 72, and subsequently undergoes reforming reactions well known to those skilled in the art. These catalyzed reactions produce, among other things, the desired hydrogen rich gas (also known as reformate or synthesis gas).

As further illustrated in FIG. 2, catalyst means 72 is preferably a fixed bed, which is contained in each of the tubular reforming modules 50. Specifically, reforming catalyst is held in module 50 by any known catalyst support means, preferably catalyst pellets held in place by a mesh grid (or other support members) located in the upper part of the modules (not shown). Additionally or alternatively, the interior of the module 50 may be coated with catalyst and may contain catalyst coated members (not shown).

The reforming catalyst should be selected using considerations known to those skilled in the art. Preferably, the catalyst will contain a precious metal such as palladium, platinum, iridium, rhodium or the like. Other traditional reforming catalysts, such and iron-and nickel-based catalysts, could also be utilized.

After the reforming reactions take place, hot reformate flows downwardly through each module 50 and is then directed through a heat exchanger 55. Preferably, each module 50 has a heat exchanger 55 integrated into its construction. These heat exchangers 55 heat the incoming fuel/steam mixture (as mentioned above) by utilizing the heat of the exiting reformate. Reformate exits module 50 and/or heat exchanger 55 through collection tubes 57. These collection tubes 57 direct the reformate into common plenum 85. Common plenum 85, in turn, forces the reformate to undergo another heat exchange process, this time passing up through super heater 60, located in the center of vessel 20 and just above chamber 70.

Finally, reformate is collected at exhaust plenum 130 and then exits assembly 10 via main outlet 100. Notably, main outlet 100 is preferably located at the top of vessel 20.

Figure 3:
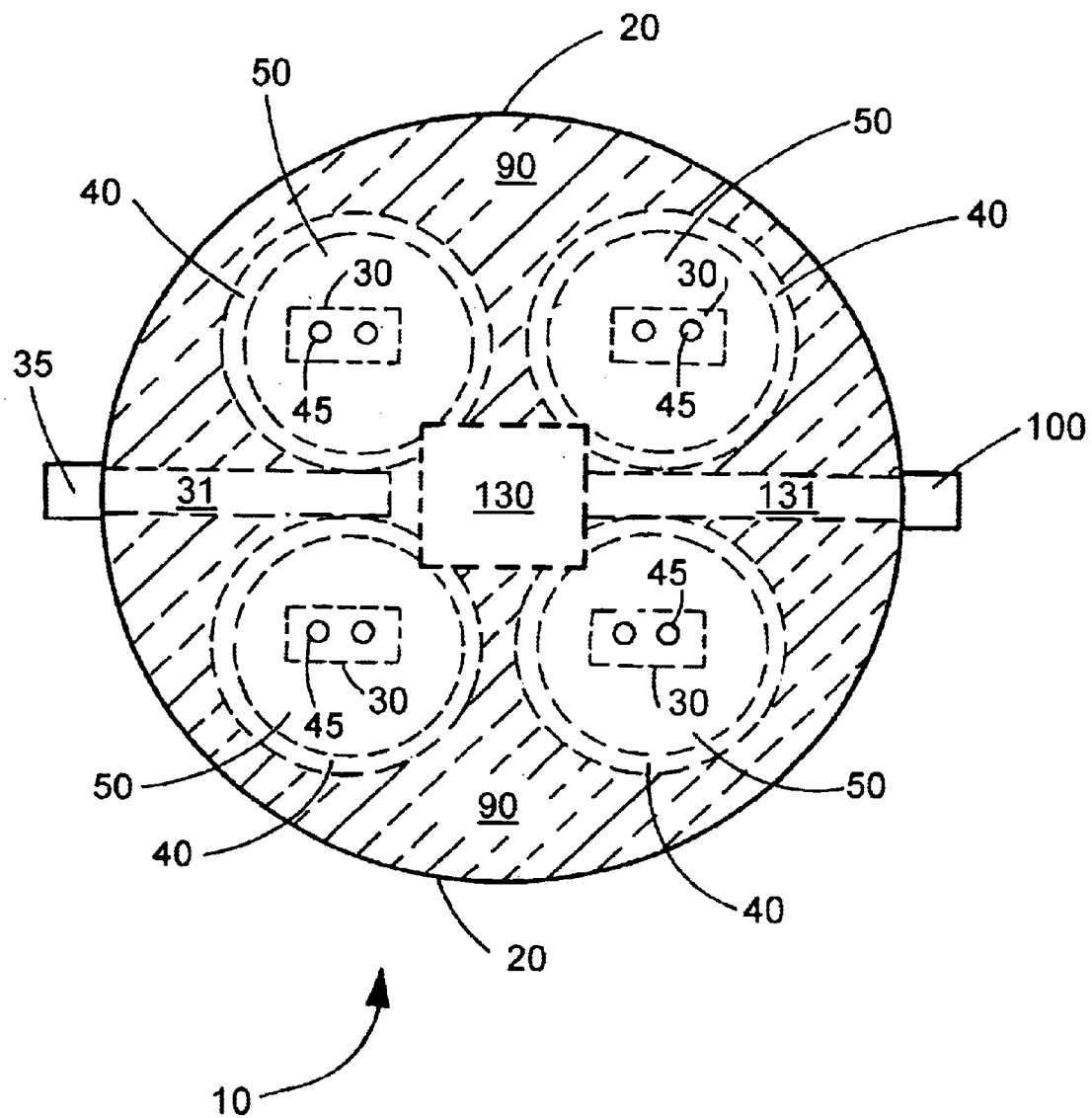
FIG. 3 is a diagrammatic representation of the internal components of the reformer of FIG. 1 taken along the line A—A.

FIG. 3 is a diagrammatic representation of a top sectional view of the assembly 10 taken along line A—A of FIG. 1. Elements in close proximity to the plane defined by line A—A are drawn with broken lines. Notably, all of the elements present in close proximity to this plane may not necessarily be shown in FIG. 3 for the purposes of clarity.

As seen in FIG. 3, annular jackets 40 surround each module 50 and permit the fuel/steam mix to flow to the top of the module 50, where the fuel/steam is then mixed with air which is delivered to distribution nozzles 45 via air distribution means 30. The fuel/steam/air is then passed over catalyst means (not shown in FIG. 3) of module 50, where the reforming reactions occur.

The steam is introduced to the assembly 10 through inlet 35, which then redirects the steam flow downward via duct 31. Duct 31 leads to a plenum which forces the steam into a superheater and then into a mixing chamber where it mixes with atomized fuel (not shown in FIG. 3).

Exhaust plenum 130 is also pictured. Reformate is collected in plenum 130 after passing through two heat exchangers (not shown in FIG. 3). Duct 131 then directs the reformate out of assembly 10 through outlet 100.

The area between modules 50 may be filled with insulation means 90. This insulation helps to enhance the thermal performance of the assembly and may add structural support for its elements.

Figure 4:
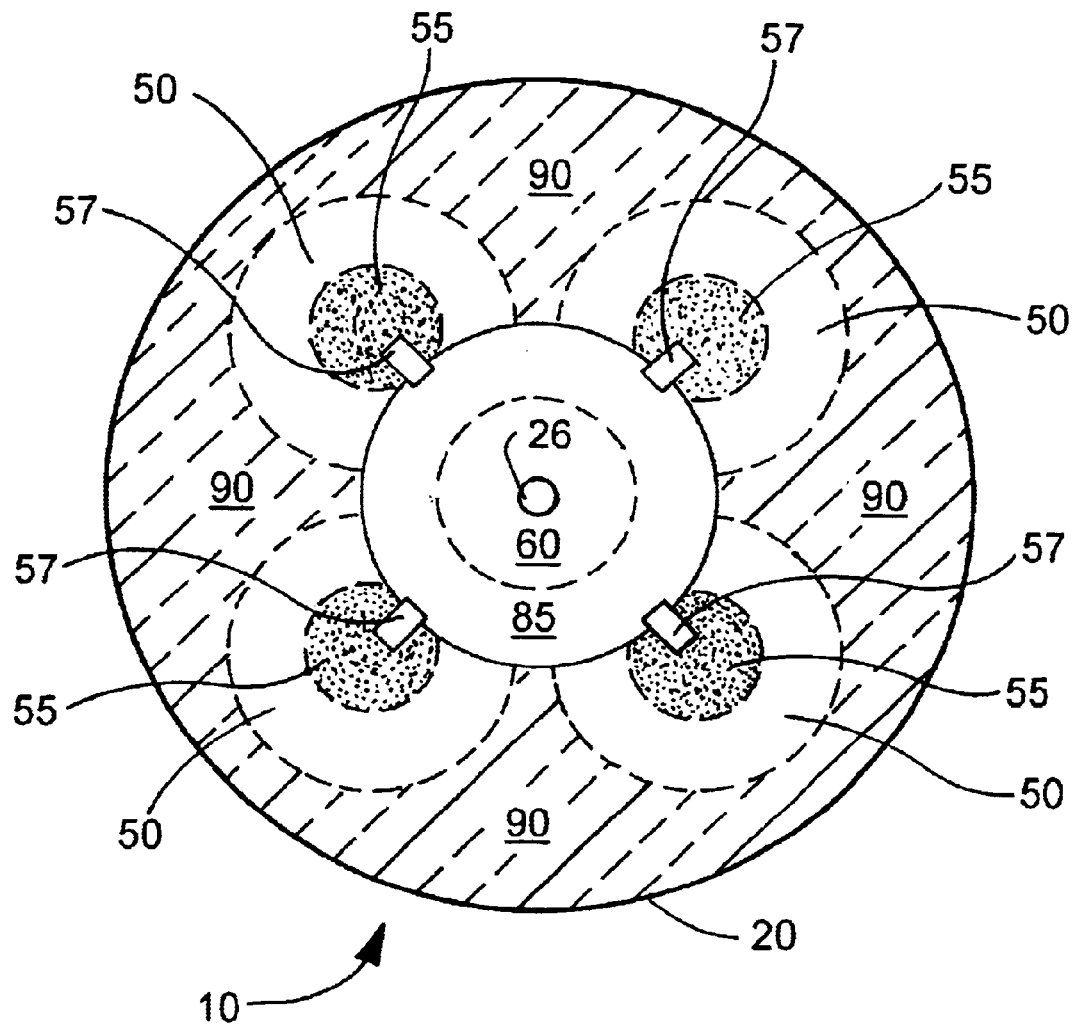
FIG. 4 is a diagrammatic representation of the internal components of the reformer of FIG. 1 taken along the line B—B.

FIG. 4 is a diagrammatic representation of a top sectional view of the assembly 10 taken along line B—B of FIG. 1. Elements in close proximity to the plane defined by line B—B are drawn with broken lines. Notably, all of the elements present in close proximity to this plane may not necessarily be shown in FIG. 4 for the purposes of clarity. Also, superheater 60, plenum 85, and atomizer 26 shown in FIG. 4 are not drawn in the same scale as they are seen in FIG. 1, again for the purposes of clarity.

As seen in FIG. 4, modules 50 are in fluidic connection with heat exchangers 55. Newly-produced hot reformate exits the catalyst bed (not shown in FIG. 4) of module 50, passes downwardly through heat exchanger 55, and then is directed via collection tubes 57 into plenum 85. Plenum 85 forces the still hot reformate up through superheater 60 as described above.

Atomizer 26 is also pictured. Atomizer 26 is fed by incoming fuel line (not shown in FIG. 4) and causes fuel to be atomized and then vaporized when it is mixed with superheated steam in a chamber (not shown in FIG. 4) located below the superheater 60. This mixing occurs prior to the fuel/steam being introduced to the top of module 50, as described above.

As above, the area between modules 50 may be filled with insulation means 90. This insulation helps to enhance the thermal performance of the assembly and may add structural support for its elements.

The bypass reformate outlet 110 at the bottom of the vessel 20 allows control of the superheated steam temperature. Specifically, the temperature of the reactions in vessel 20 may be selectively controlled by utilizing bypass outlet 110 to reduce or increase the flow of hot reformate passing through superheater 60 (this controls the temperature of the fuel/steam mix provided to each module 50). Essentially, this control mechanism can be utilized to prevent overheating of the catalyst beds and to more generally operate the assembly 10 over a range of desired throughputs.

This bypass control represents an improvement over other known reforming methods and assemblies in that it permits a simple means of monitoring and controlling the reforming reactions through alteration of the heat exchange temperatures in superheater 60. Alternatively or additionally, bypass outlet 110 can be connected to a holding tank which subsequently feeds back into main outlet 100, thereby allowing the selective control of the quantity of reformate exiting assembly 10.

The modules 50, fuel atomizer 26, and superheater 60 are contained within the pressured vessel 20. This provides the advantage of having all of the atomized and vaporized fuel contained within a single pressure vessel 20. Notably, the optimal operating pressurization of vessel 20 is in the range of 50 psig. Pressurization at any desired level will permit the assembly 10 to have a more compact construction. Ultimately, those skilled in the art will select a pressurization to suit the needs of a particular system.

Superheater 60 may be utilized as needed to heat the incoming reactants. Those skilled in the art will be able to adapt superheater 60 to heat the air, fuel, steam, and/or fuel/steam mix as required. Similarly, heat exchanger 55 may also be adapted to heat the air, fuel, steam, and/or fuel/steam mix as required. The construction described above and illustrated in the figures is merely the preferred arrangement for each of these elements.

Use of multiple, self-contained modules 50 enhances the overall operation of the assembly. Similar to the bypass control discussed above, the incoming reactants' flowpath may be selectively controlled and directed into any number of desired modules(e.g., through the use of remotely controlled valves placed at the inlets 25, 30, 35 and/or at the nozzles 45, annular jackets 40, and collection tubes 57 or other known control means). Additionally or alternatively, the modules may be designed to have varying amounts of reactivity (by altering the catalyst content and/or quanitity present in each module). These sorts of selective controls, combined with the fact that each module operates independent of the other, would result in an ability to manipulate the quantity/quality of the reformate in real-time to suit the particular needs of the overall system.

Careful design of the vessel 20 could also permit easier service, replacement, and/or removal of modules without requiring extended periods of downtime. However, this advantage would be tempered by the increased complexity of the operational and construction requirements necessary to adapt pressurization vessel 20 for this purpose.

Another advantage to the present invention is better thermal integration, since all hot components are close together. Notably, high performance insulation 90 may be strategically placed to further enhance thermal integration. The insulation 90 may be of any type known to those skilled in the art, and the insulation 90 need not be hydrogen permeable.

In fact, unlike some prior art reformers (such as the one disclosed in U.S. Pat. No. 5,938,800, assigned to McDermott Technology Inc. and incorporated by reference herein), the present invention eliminates altogether the need for hydrogen membranes. Similarly, the present design does not rely upon the presence of excessively hot flue gas in order to have the invention function properly.

Still another advantage of the present invention in comparison to prior reformers is its ability to handle a wide range of incoming hydrocarbon fuels. Specifically, incoming fuel may be either liquid or gaseous, and the integrated bypass control would further permit adjustment of the system's performance based on the type of fuel being fed into the system. Additionally, those skilled in the art could specifically engineer each module 50 to efficiently process a particular type of incoming fuel (through judicious catalyst selection, beat exchanger performance, nozzle and annular jacket construction, etc.), so that the selective control of reactant flowpaths would direct the incoming fuel to the proper module 50.

The capacity of each module 50 is preferably sufficient to supply hydrogen to a 50 kW fuel cell. Additional capacity, i.e. scaleup, is achieved with lower risk by adding more modules 50, compared to increasing the size of an individual module 50.

While a specific embodiment of the invention has been shown and described in detail to illustrate the application of the principles of the invention, it will be understood that the invention may be embodied otherwise without departing from such principles.

We claim:

1. An auto-thermal reformer for catalytic production of hydrogen rich gas from fuel, steam, and air, comprising:
   a pressure vessel;
   a plurality of reforming modules located within the pressure vessel and each having a module inlet and a module outlet;
   means for distributing air into each of the plurality of reforming modules;
   an area for mixing steam and fuel located within the pressure vessel;
   means for distributing a fuel into the area for mixing;
   means for distributing steam into the area for mixing;
   means for directing the mixed fuel and steam from the area for mixing into at least one of the module inlets; and
   means for directing hydrogen rich gas from at least one module outlet out of the pressure vessel.

2. An auto-thermal reformer according to claim 1, further comprising primary means for exchanging heat from the hydrogen rich gas to at least one of: the air, the fuel, the steam, and the mixed fuel and steam, the primary means for exchanging heat being fluidically connected to each reforming module; and wherein each reforming module includes a catalyst for enhancing reforming reactions between the air and the mixed fuel and steam.

3. An auto-thermal reformer according to claim 2, wherein the catalyst includes at least one of: palladium, platinum, iridium, rhodium, iron, and nickel.

4. An auto-thermal reformer according to claim 2, wherein the catalyst is held in place within each reforming module by support means.

5. An auto-thermal reformer according to claim 4, wherein the support means includes at least one of: a packed bed of catalyst pellets, catalyst-coated members, and structural support members.

6. An auto-thermal reformer according to claim 2, wherein the means for directing the hydrogen rich gas out of the pressure vessel includes secondary means for exchanging heat between the hydrogen rich gas and at least one of: the air, the steam, the fuel, and the mixed fuel and steam, the secondary means for exchanging heat being located within the pressure vessel.

7. An auto-thermal reformer according to claim 6, further comprising means for selectively controlling the hydrogen rich gas production of the reformer.

8. An auto-thermal reformer according to claim 7, wherein the means for selectively controlling the hydrogen rich gas production of the reformer includes means for controllably bypassing the hydrogen rich gas from the secondary means for exchanging heat.

9. An auto-thermal reformer according to claim 6, further comprising means for selectively controlling hydrogen rich gas production of each reforming module.

10. An auto-thermal reformer according to claim 9, wherein the means for selectively controlling the hydrogen rich gas production of each reforming module comprises means for controllably reducing or stopping the air and the mix of fuel and steam from entering a selected reforming module.

11. An auto-thermal reformer according to claim 7, further comprising means for selectively controlling hydrogen rich gas production of each reforming module.

12. An auto-thermal reformer according to claim 11, wherein the means for selectively controlling the hydrogen rich gas production of the reformer includes means for controllably bypassing the hydrogen rich gas from the secondary means for exchanging heat and wherein the means for selectively controlling the hydrogen rich gas production of each reforming module comprises means for controllably reducing or stopping the air and the mix of fuel and steam from entering a selected reforming module.

13. An auto-thermal reformer according to claim 12, wherein the fuel is a liquid fuel and wherein the means for distributing the fuel to the area for mixing causes the fuel to be atomized.

14. An auto-thermal reformer according to claim 1, wherein the means for directing the hydrogen rich gas out of the pressure vessel includes means for exchanging heat between the hydrogen rich gas and at least one of: the air, the steam, the fuel, and the mixed fuel and steam.

15. An auto-thermal reformer according to claim 14, further comprising means for selectively controlling the hydrogen rich gas production of the reformer.

16. An auto-thermal reformer according to claim 15, wherein the means for selectively controlling the hydrogen rich gas production of the reformer includes means for controllably bypassing the hydrogen rich gas from the means for exchanging heat.

17. An auto-thermal reformer according to claim 1, wherein the fuel is a liquid fuel and wherein the means for distributing the fuel to the area for mixing causes the fuel to be atomized.

18. An auto-thermal reformer according to claim 1, wherein the vessel is pressurized to about 50 psig.

19. An auto-thermal reformer according to claim 13, wherein the primary means for exchanging heat comprises a heat exchanger for transferring heat between the hydrogen rich gas and the mix of fuel and steam; wherein the secondary means for exchanging heat comprises a superheater for transferring heat between the hydrogen rich gas and the steam; and wherein the means for distributing air comprises at least one nozzle disposed within each reforming module.

20. An auto-thermal reformer according to claim 19, wherein the catalyst includes at least one of: palladium, platinum, iridium, rhodium, iron, and nickel.

21. An auto-thermal reformer according to claim 20, wherein the catalyst is held in place within each reforming module by support means.

22. An auto-thermal reformer according to claim 21, wherein the support means includes at least one of: a packed bed of catalyst pellets, catalyst-coated members, and structural support members.

23. An auto-thermal reformer according to claim 22, wherein the vessel is pressurized to about 50 psig.

24. An auto-thermal reformer according to claim 6, wherein the secondary means for exchanging heat comprises a superheater for transferring heat between the hydrogen rich gas and the steam and wherein the means for distributing air comprises at least one nozzle disposed within each reforming module.

25. An auto-thermal reformer according to claim 24, wherein the primary means for exchanging heat comprises a heat exchanger for transferring heat between the hydrogen rich gas and the mix of fuel and steam.

26. A method for controllably producing hydrogen rich gas from a supply of air, steam, and fuel, comprising:

providing a pressurized vessel having a plurality of separate reforming modules;

directing separate streams of air, steam, and fuel to each module;

mixing the air, steam, and fuel streams in each module in the presence of a catalyst to induce reforming reactions to produce hot hydrogen rich gas; and prior to mixing, heating at least one of: the air, the steam, and the fuel, with excess heat from a selected amount of the hydrogen-rich gas and adjusting the selected amount of hydrogen-rich gas used to heat the air, the steam, and the fuel to control the reforming reactions.

27. A method according to claim 26, wherein the streams of air, steam, and fuel are directed to only a selected number of the separate reforming modules to further control the production of hydrogen rich gas.

28. A method according to claim 27, wherein at least two of the separate reforming modules have different catalysts.

* * * * *